(No Model.)
J. G. MOOMY.
BELT PULLEY.
No. 410,763. Patented Sept. 10, 1889.
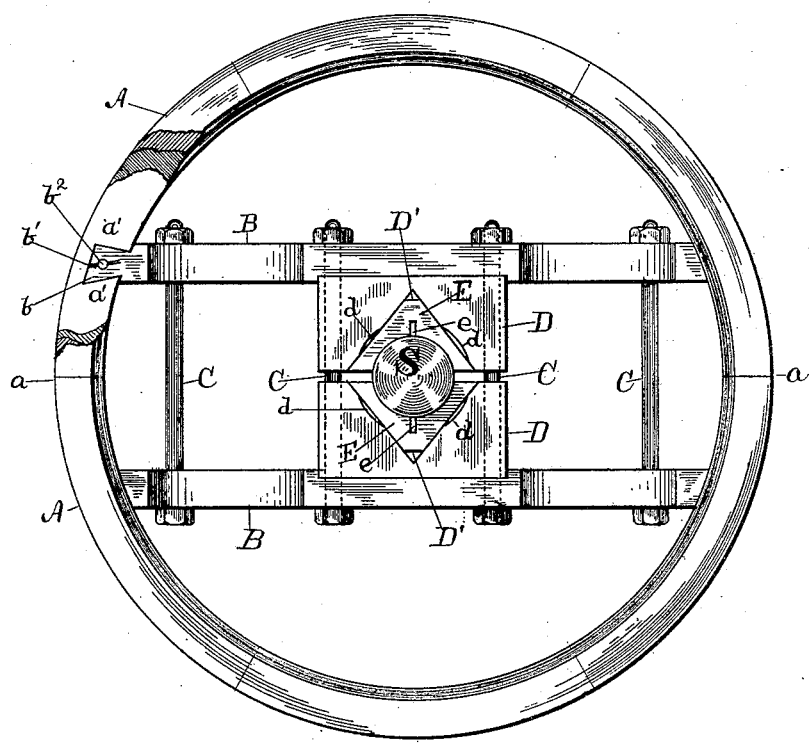
Witnesses
S. D. Dobbins.
T. J. Perrin
Inventor
Joseph G. Moomy
By his Attys. Hallock & Hallock

UNITED STATES PATENT OFFICE.

JOSEPH G. MOOMY, OF ERIE, PENNSYLVANIA.

BELT-PULLEY.

SPECIFICATION forming part of Letters Patent No. 410,763, dated September 10, 1889.

Application filed April 8, 1889. Serial No. 306,312. (No model.)

*To all whom it may concern:*

Be it known that I, JOSEPH G. MOOMY, a citizen of the United States, residing at Erie, in the county of Erie and State of Pennsylvania, have invented certain new and useful Improvements in Belt-Pulleys; and I do hereby declare the following to be a full, clear, and exact description of the invention, such as will enable others skilled in the art to which it appertains to make and use the same.

My invention relates to belt-pulleys; and it consists in certain improvements in the construction thereof, as will be hereinafter fully set forth, and pointed out in the claims.

My invention is illustrated in the accompanying drawing, as follows: The figure is a side elevation of a pulley made in accordance with my invention, there being parts broken away to show construction.

A marks the rim of the pulley, which is divided at $a$ $a$, if the pulley is to be what is commonly called a "split" pulley. This rim A is made up of segmental pieces, as commonly.

B B mark the spoke-bars, which extend across from side to side of the rim.

C C C C are clamping-bolts by which the two parts of the pulley are held together, as commonly.

D D are blocks secured to the spoke-arms, which form the hub of the pulley.

D' D' are V-shaped cuts or notches in the hub-blocks D, which together form the central opening through the hub for the reception of the shaft. In the walls of the notches D' are curved indentures $d$ $d$ $d$ $d$, which form seats for a shaft when bushings are not used.

E E are V-shaped bushings which set within the V-formed notches D', and have semicircular grooves in one of their faces to receive the shaft S. If desired, these bushings E may have kerfs $e$ cut in them to give them a slight degree of flexibility, so they will yield, if necessary, somewhat under pressure. When the pulley is to be put on a large-sized shaft, the bushing E need not be used, the indentures $d$ $d$ $d$ in the walls of the hub-blocks D affording sufficient bearing-surface to secure a perfect grip of the pulley to the shaft. When the shaft S is of smaller diameter, the bushings E will be used, and various-sized bushings may be use for various-sized shafts, as required.

Another feature of my invention relates to the manner of securing the ends of the spoke-arms in the rim of the pulley. The rim of the pulley is built up, as commonly—that is to say, a section of the rim comprising several rings is made, and then the spoke-arms are put in, and then the final or finishing rings are put on. On the left of Fig. 1 the finishing-rings are broken away, so as to show the form of the end of the spoke-arm and the notch in which it is inserted. The spoke-arms are made of plank with the grain running lengthwise of it, as commonly. A dovetail-formed tenon $b$ is formed on the ends of the spoke-bars, and dovetail-formed notch $a'$ is cut in the rim A. Before the spoke-arm is put in place a hole $b^2$ is bored through it on a line parallel with the axis of the pulley, and a kerf $b'$ is sawed into the arm through the hole $b^2$. The direction of this kerf is parallel with the axis of the pulley, but at an angle to the grain of the wood of the arm B. After the spoke-arm is in place a wedge-formed pin is driven into the hole $b^2$, which spreads the dovetail tenon $b$ slightly, so it will fill the dovetail notch $a'$ tightly. The object in having the kerf $b'$ at an angle to the grain of the wood of the arm B is to prevent the arm from splitting out as the wedge pin is driven in.

What I claim as new is—

1. In a belt-pulley, the combination, with the rim-sections A A, of spoke-bars B B, bolts C C C C, hub-blocks D D, having V-formed notches D' D', and V-shaped bushings E E, fitting in said notches and on the shaft S, and having kerfs or cuts $e$ from the shaft toward the apex of said bushings.

2. In a belt-pulley, the combination, with the rim part A, having dovetail notches $a'$, of the spoke-arms B, having dovetail tenons $b$ with kerfs $b'$, and the holes $b^2$ for wedge-pins within said tenon.

In testimony whereof I affix my signature in presence of two witnesses.

JOSEPH G. MOOMY.

Witnesses:
 JNO. K. HALLOCK,
 CHAS. B. LECHNER.